United States Patent
Baer

(10) Patent No.: US 10,306,702 B2
(45) Date of Patent: May 28, 2019

(54) METHODS AND APPARATUSES FOR USER DISTRIBUTION OVER MULTIPLE MOBILE NETWORKS

(71) Applicant: Telia Company AB, Solna (SE)

(72) Inventor: Anders Baer, Arsta (SE)

(73) Assignee: Telia Company AB (SE)

( * ) Notice: Subject to any disclaimer, the term of this patent is extended or adjusted under 35 U.S.C. 154(b) by 0 days.

(21) Appl. No.: 15/848,871

(22) Filed: Dec. 20, 2017

(65) Prior Publication Data
US 2018/0176981 A1    Jun. 21, 2018

(30) Foreign Application Priority Data

Dec. 20, 2016  (SE) ..................... 1651687

(51) Int. Cl.
| | |
|---|---|
| H04W 76/50 | (2018.01) |
| H04W 4/90 | (2018.01) |
| H04W 36/14 | (2009.01) |
| H04W 72/04 | (2009.01) |
| H04W 36/00 | (2009.01) |
| H04W 8/18 | (2009.01) |
| H04W 36/22 | (2009.01) |
| H04W 48/18 | (2009.01) |
| H04W 48/16 | (2009.01) |

(52) U.S. Cl.
CPC ............ *H04W 76/50* (2018.02); *H04W 4/90* (2018.02); *H04W 8/18* (2013.01); *H04W 36/0022* (2013.01); *H04W 36/14* (2013.01); *H04W 36/22* (2013.01); *H04W 48/18* (2013.01); *H04W 72/0493* (2013.01); *H04W 48/16* (2013.01)

(58) Field of Classification Search
CPC ... H04W 76/50; H04W 72/0493; H04W 4/90; H04W 8/18; H04W 36/14; H04W 36/0022; H04W 76/20; H04W 28/08; H04W 36/22
See application file for complete search history.

(56) References Cited

U.S. PATENT DOCUMENTS

| | | | |
|---|---|---|---|
| 8,923,116 B1 | 12/2014 | Seleznyov | |
| 9,648,545 B2 | 5/2017 | Smith et al. | |
| 9,706,378 B2 * | 7/2017 | Mahendran | ....... H04L 29/12594 |
| 2002/0131397 A1 | 9/2002 | Patel et al. | |
| 2007/0111734 A1 * | 5/2007 | Beppu | ................... H04W 28/08 |
| | | | 455/453 |
| 2014/0355428 A1 * | 12/2014 | Smith | ................... H04W 48/06 |
| | | | 370/230 |
| 2014/0369188 A1 | 12/2014 | Seleznyov | |
| 2016/0295386 A1 * | 10/2016 | Faccin | ............... H04L 63/0485 |

* cited by examiner

*Primary Examiner* — Said M Elnoubi
(74) *Attorney, Agent, or Firm* — Burr & Forman LLP; Jeffrey H. Kamenetsky

(57) ABSTRACT

The embodiments herein relate to a network device, a network node, a mobile device and respective method. The network device is configured to receive from a network node of each network provider information including a percentage of network utilization and based on that information determine a list including information on network providers to which mobile devices may connect to in the event of an emergency. The network providers being comprised in a given geographical area and connected to the network device.

17 Claims, 9 Drawing Sheets

700

701

Receiving, from a network node of a network provider to which the mobile device is subscribing, an individual list including information on other network providers it may connect to in the event of an emergency

702

Selecting from the list the network provider to connect to, when the network provider (or node) to which the mobile is subscribing is no longer accessible due to the emergency event

METHODS AND APPARATUSES FOR USER DISTRIBUTION OVER MULTIPLE MOBILE NETWORKS

TECHNICAL FIELD

The present disclosure relates to the field of wireless communications, and in particular to methods and apparatuses for distributing users over multiple networks due to an emergency event such as network outage, congestion, catastrophic events like earthquake, storm, sabotage etc.

BACKGROUND

With advances in technologies, mobile devices such as smart phones are playing a key role in our day to day life. Although the smart phones have many applications such as multimedia, entertainment, gaming and so on, the main use of such devices is still to achieve communication such as voice calls, SMS, MMS, notifications etc.

An example of a notification is a warning notification in the event of an emergency or catastrophic event. Today, there are different types of Public Warning Systems (PWS) for example Earthquake and Tsunami Warning System (EWTS), Commercial Mobile Alert System (CMAS), enabling transmission of warning notifications to the mobile devices in a network environment about upcoming catastrophic or disaster events such as incoming earthquakes and/or tsunamis.

In disaster situations, there is a risk of congestions in a mobile network due to unusually large numbers of mobile device subscribers trying to communicate over the mobile network. The mobile network, in these cases, cannot serve it subscribers in a satisfactory way. The same applies in situations where network outage occurs i.e. the subscribers are not able to communicate over the mobile network.

In addition, since mobile devices connected to an operator-controlled network usually are authenticated using a Subscriber Identity Module (SIM)-card, these mobile devices that cannot access their subscribed network, due to congestion, cannot get access to services other than emergency services like 911 or 112 (police, fire, and/or ambulance). This is quite limiting since an emergency center answering emergency calls will eventually be overloaded and therefore cannot serve the full purpose of the user needs.

In principle, the emergency notifications generally reach the mobile devices independently of the mobile network to which the mobile device is connected. Such notifications may be controlled by a PWS, ETWS or CMAS which are standardized to handle such emergency communication. Usually, the way the mobile device is instructed is via broadcast technologies. For example, in ETWS, there are standardized a primary notification and a secondary notification. The primary notification is information which is used in order to notify users about the most urgent event in seconds rather than minutes, such as imminent occurrence of earthquake. The secondary notification is used in order to notify users supplementary information that is of lesser urgency such as instructions on what to do and/or where to get help, for example, map to refuge facilities, time table of food distribution.

However, after receiving such notification(s), mobile devices tend to simultaneously contact their family members or friends etc. to inform them about e.g. the emergency situation. This may lead to congestion as previously described. These mobile devices are however subscribers meaning that a non-subscriber may only call an emergency number (911 or 112) or receive an emergency notification but cannot send an SMS or call to another person (family member, friend, colleague, etc.).

There is therefore a need for a solution to solve the above problems. The solution may be viewed as complement, replacement or enhancement to a public warning system.

SUMMARY

It is an object of embodiments herein to solve the above problems by providing a network device and a method thereof; a network node and a method thereof and a mobile device and a method thereof to provide at least the advantageous described below.

According to an aspect of embodiments herein, there is provided a method performed by a network device connected to a plurality of network providers in a given geographical area. The method including: periodically receiving, from a network node of each network provider, information including a percentage of network utilization; determining, for each network provider, based on at least the received percentage of network utilization of the network provider, an individual list including information on other available network providers to which mobile devices subscribing to the network provider may connect to in the event of an emergency; and instructing the network node of each network provider to transmit said determined individual list received from the network device, to mobile devices subscribing to the network provider.

According to another aspect of embodiments herein, there is provided a network device configured to be connected to a plurality of network providers, the network device comprising a processor and a memory containing instructions executable by the processor, wherein the network device is operative to:
periodically receive, from a network node of each network provider, information including a percentage of network utilization; determine, for each network provider, based on at least the received percentage of network utilization of the network provider, an individual list including information on other available network providers to which mobile devices subscribing to the network provider may connect to in the event of an emergency; and instruct the network node of each network provider to transmit said determined individual list received from the network device, to mobile devices subscribing to the network provider.

According to another aspect of embodiments herein, there is provided a method performed by a network node of a network provider connected to a network device to which a plurality of network providers are connected the method comprising: periodically transmitting, to the network device and for a given geographical area, information including a percentage of network utilization; receiving from the network device an individual list including information on other available network providers, in the geographical area, to which mobile devices subscribing to the network provider may connect to in the event of an emergency; where the list is determined by the network device based on at least the information including the percentage of network utilization. The method further comprises, transmitting the individual list to the mobile devices. The network node may transmit the list to the network providers that then distribute it further to the mobile devices.

According to another aspect of embodiments herein, there is provided a network node of a network provider connected to a network device to which a plurality of network providers are connected. The network node comprising a processor and a memory containing instructions executable by the processor, wherein the network node is operative to: periodically transmit, to the network device and for a given geographical area, information including a percentage of network utilization. The network node is further operative to receive from the network device an individual list including information on other available network providers, in the geographical area, to which mobile devices subscribing to the network provider may connect to in the event of an emergency. The list is determined by the network device based on at least the information including the percentage of network utilization. The network node is further operative to transmit the list to the mobile devices. The network node may transmit the list to the network providers that then distribute it further to the mobile devices.

According to another aspect of embodiments herein, there is provided a method performed by a mobile device in a geographical comprising a plurality of network providers each connected to a network device, the method comprising: receiving from a network node of a network provider to which the mobile device is subscribing, a list including information on other available network providers, in the geographical area, to which the mobile device may connect to in the event of an emergency. In the event of an emergency and when the network provider to which the mobile device is subscribing is no longer accessible, selecting from the list a network provider to connect to.

According to another aspect of embodiments herein, there is provided a mobile device. The mobile device being located in a given geographical area comprising a plurality of network providers or operators each connected to a network device. The mobile device comprising a processor and a memory containing instructions executable by the processor, wherein the mobile device is operative to: receive from a network node of a network provider to which the mobile device is subscribing, a list including information on other available network providers, in the geographical area, to which the mobile device may connect to in the event of an emergency. In the event of an emergency and when the network provider to which the mobile device is subscribing is no longer accessible, the mobile device is operative to select from the list a network provider to connect to.

An advantage with embodiments herein is to provide a redundancy solution allowing subscribers to a network provider to have access to necessary services of another network provider in an emergency situation.

Another advantage is to reduce the load on emergency centers in an emergency situation.

Yet another advantage herein is to complement or improve the public warning system by further providing before the occurrence of an emergency situation, a list of networks to connect to and services that mobile devices may use in the event of an emergency.

Another advantage herein is to free up resources in the network allowing more mobile devices to be able to use minimum of services.

Additional advantages achieved by the invention will become apparent from the following detailed description when considered in conjunction with the accompanying drawings.

BRIEF DESCRIPTION OF THE DRAWINGS

Examples of embodiments herein are described in more detail with reference to attached drawings in which.

DETAILED DESCRIPTION

The following description with reference to the accompanying drawings is provided to assist in a comprehensive understanding of various embodiments of the present disclosure as defined by the claims and their equivalents.

The various embodiments herein achieve methods and apparatuses that guide a mobile device to take appropriate steps to select a network and be provided with services provided by the selected network. The solution is provided in case of an emergency situation or event such as congestion or outage in the network of an operator or provider to which the mobile device is a subscriber. The outage or congestion may be due to catastrophic events such as an earthquake, a tsunami or any disaster event.

According to an embodiment, there is provided a network device which is configured to be connected to a plurality of network providers or network operators for a given geographical area. This network device may be viewed as a centralized point. The network device may be connected to the core network of each network provider or be connected to the radio access network of each network provider.

The network device may be controlled by a government regulated authority that manages public safety (PWS) or by an organization that network operators/providers can trust. The network device may also be controlled by a Public Land Mobile Network (PLMN).

According to an embodiment herein, each network provider or network operator connected to the network device in the given geographical area is configured to report its network utilization (in percentage) down to cell information level to the network device. This in order to keep a close real-time understanding of the network performance at cell level of each connected operator.

Figure 1:
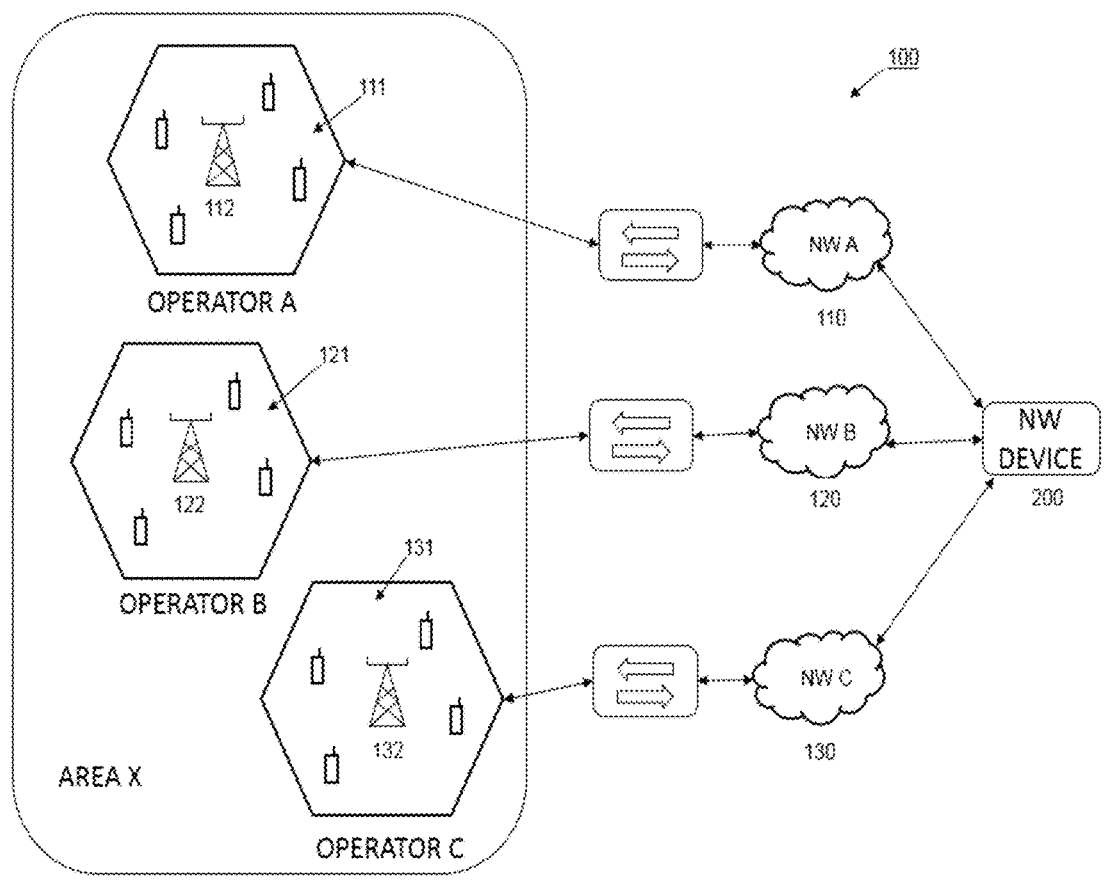
FIG. 1 depicts a network environment wherein embodiments herein may be employed.

FIG. 1 illustrates an example of a network environment 100 comprising a plurality of networks providers denoted NW A 110, NW B 120 and NW C 130 respectively. Note that the network environment may comprise any number of networks providers or operators. Each network provider maybe viewed as a network operator or belong to a network operator. For example NW A 110 belongs to operator A; NW B 120 belongs to operator B, and NW C 130 belongs to operator C. FIG. 1 also shows a geographical area (denoted here AREA X) comprising 3 cells 111, 121 and 131. Cell 111 belonging to operator A, cell 121 belongs to operator B and cell 131 belongs to operator C.

Generally an operator controls a plurality of cells, but, for the sake of simplicity, only one cell per operator is shown.

In each cell a radio base station (RBS) or network node is shown. An example of a RBS is a NodeB, an eNodeB, an Access Point (AP) etc. or a combination thereof. Network node or RBS 112 of operator A serves cell 111. RBS 122 of operator B serves cell 121 and RBS 132 of operator C serves cell 131. Further in each cell a plurality of mobile devices or user equipments are located. Here it is assumed that mobile devices in cell 111 of operator A are subscribers to operator A; mobile devices in cell 121 of operator B are subscribers to operator B and mobile devices in cell 131 of operator C are subscribers to operator C.

During operation, and as previously described, a percentage of network utilization down to cell level is regularly or periodically reported to network device 200. The periodicity may be decided by the network device or by the network provider. The reporting may be performed by the network node or RBS of each network provider or operator in Area X. A network utilization is the amount of traffic on the network compared to the peak amount that the network can support.

The network device 200 is configured to recalculate/determine where the users or subscribers connected to the affected cell should be relocated and which services should be made available in the event of an emergency. The network device 200 may also determine for how long such services may be available.

By relocated is meant to which network provider or operator a mobile device should connect to in the event the preferred network (as the mobile device is a subscriber to) can no longer be accessed due to the emergency situation. The network providers (or operators) that have network coverage and are active in the geographical area may have an agreement with the administration role of the network device to allow non-subscribing mobile devices to be offered minimal services in case of an emergency or catastrophic even.

The network device 200 determines, for each network provider, based on at least the received percentage of network utilization, a list including information on other available network providers to which mobile devices subscribing to the network provider may connect to in the event of an emergency. The list is transmitted to the network provider which is instructed to send it to its subscribers. The list is sent prior the occurrence of the emergency event.

For example, assuming that cell 111 of operator A is affected in terms of outage or congestion. Since the network device 200 regularly or periodically receives the percentage of network utilization from operator A or NW A (via RBS 112), the network device 200 knows that operator A has been affected. For example, assuming that the percentage of network utilization in the latest report from operator A has dropped substantially or has increased substantially as compared to the information in the previous report, or no reporting from operator A is received. In such a scenario, the previously list sent to subscribers of operator A or NW A, also denoted individual list, will be used. The list may contain information (1. operator B (NW B), 2. operator C (NW C)). An operator or network provider may be indicated in the list in the form of an ID number, such as cell ID, SSID (Service Set Identifier), etc. or any suitable ID format. The list may also include a Mobile Country Code (MCC), a Mobile Network Code (MNC), a Location Area Identification (LAI) etc. In the event a subscriber of operator A no longer can access its own network provider (operator A), the subscriber attempts first to connect to operator B indicated as first in the list. In case operator B cannot provide access to this subscriber, the subscriber attempts to connect to operator C, etc.

It should be mentioned that since the network device providing the individual lists may be managed by a government regulated authority that manages public safety the network device knows when an emergency situation occurs.

Alternatively, the network device 200 may be provided with an emergency mode that is activated in the event of an emergency. The network device 200 will inform or trigger this to the network providers that are connected to the network device 200 so they know that subscribers from other network providers than the network's own subscribers are allowed to connect. Hence, activation of the emergency mode provide mobile devices with information on the "allowed networks" to connect to.

Each network provider may further inform the network device 200 of which radio access technology (ies) that is/are supported by the provider such as 2G, 3G, 4G, 5G, WiFi, etc. This allows the network device 200 to also indicate in the individual list the access technology that may be used by the mobile devices and also, as described before, the services available. For example, the list may include: [operator B (2G) (voice and SMS) and operator C (3G) (voice, SMS and MMS)]. The mobile device first attempts to connect to operator B using 2G access technology and knows that only voice and SMS may be available in cell 121. If the attempt fails, the second operator, operator C, indicated in the list is tried using 3G access technology.

An advantage with the above is to overcome the potential gap between network updates from the network device 200 indicating which networks or providers are most suited to serve the mobile device and what services are available. The solution thus provides a "semi-emergency" state, where all available networks may serve a mobile device with a service profile that allows a limited set of services to the user of the mobile device. The service profile is also denoted here an emergency service profile.

The distribution or relocation of the mobile devices is preferably performed in a way to avoid causing congestion in the selected cell of the selected operator. In this case individual lists may be pushed to the mobile devices. For example, mobile device 1 and mobile device 2 of operator A may receive a list indicating [operator B (2G, SMS, voice); operator C (3G, SMS, voice MMS)], while mobile device 3 and mobile device 4 of operator A may receive a list with a different order indicating [operator C (3G, SMS, voice, MMS); operator B (2G, SMS, voice)]. Hence, provided the connection to the selected network provider is successful, mobile device 1 and 2 will be connected to operator B, while mobile device 3 and 4 will be connected to operator C, thus achieving a fair distribution of users/mobile devices of operator A among available networks in the given geographical area.

The International Mobile Subscriber Identity (IMSI) is generally used to identify a mobile device a network area. IMSI is generated from information on the SIM. For example a network provider or provider may provide the IMSI of each connected mobile device to the network device together with the information on percentage of network utilization. This information may also be used to determine the individual lists.

Instead of the IMSI, a Temporary Mobile Subscriber Identity (TMSI) or a Packet-TMSI (P-TMSI) may be used to protect the identity of a mobile device. TMSI or P-TMSI is usually generated from the IMSI. The Location Area Identity (LAI) and the TMSI may be used to uniquely identify a mobile device in a network area. The LAI and the P-TMSI of each mobile device may be used by the network device for determining the distribution list.

Figure 2A:
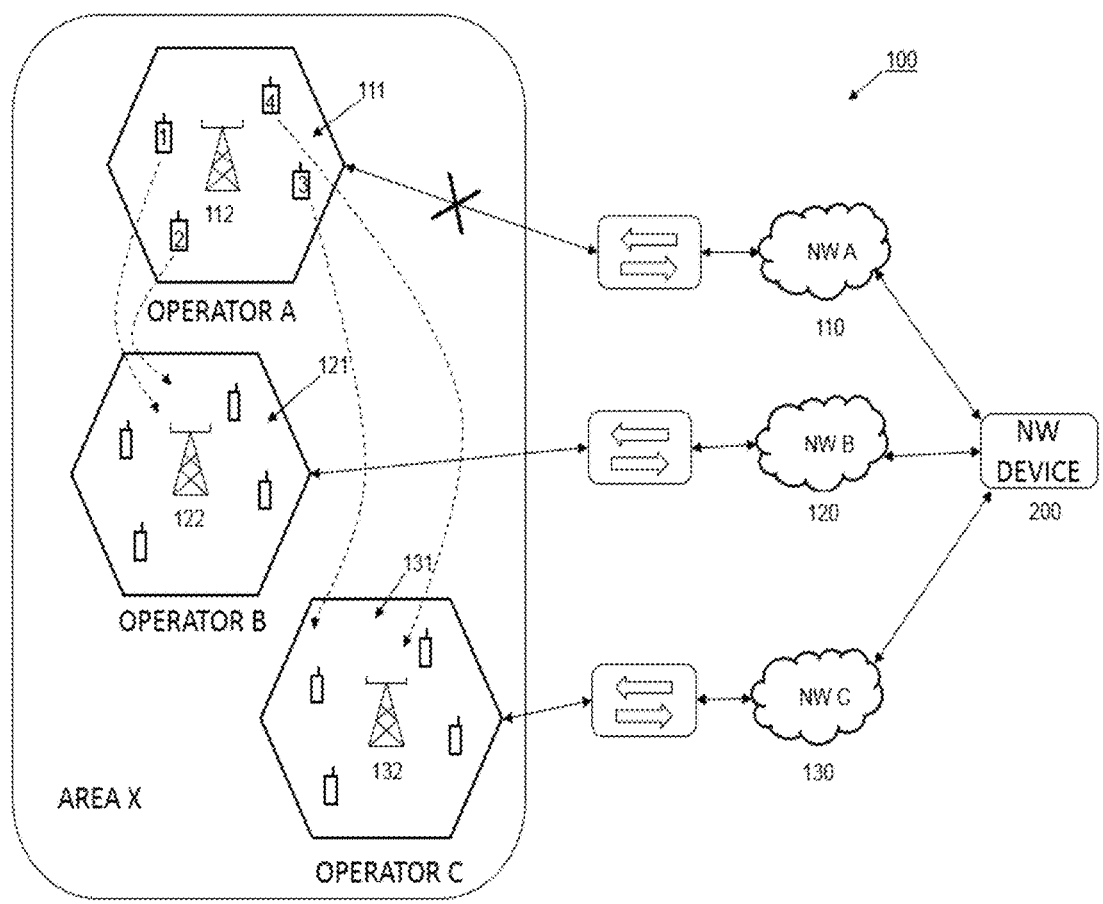
FIG. 2A-2B depict network outage or network congestion experienced by an operator or network provider in the network environment of FIG. 1 and also show relocation or distribution of mobile devices.

Referring to FIG. 2A there is illustrated the case when mobile devices (1 and 2) of operator A are to be handed over or relocated to cell 121 of operator B, and other mobile devices (3 and 4) of operator A are to be handed over or relocated to cell 131 of operator C. In FIG. 2A, the thick cross shows that operator A at cell level has been affected by an outage.

Figure 2B:
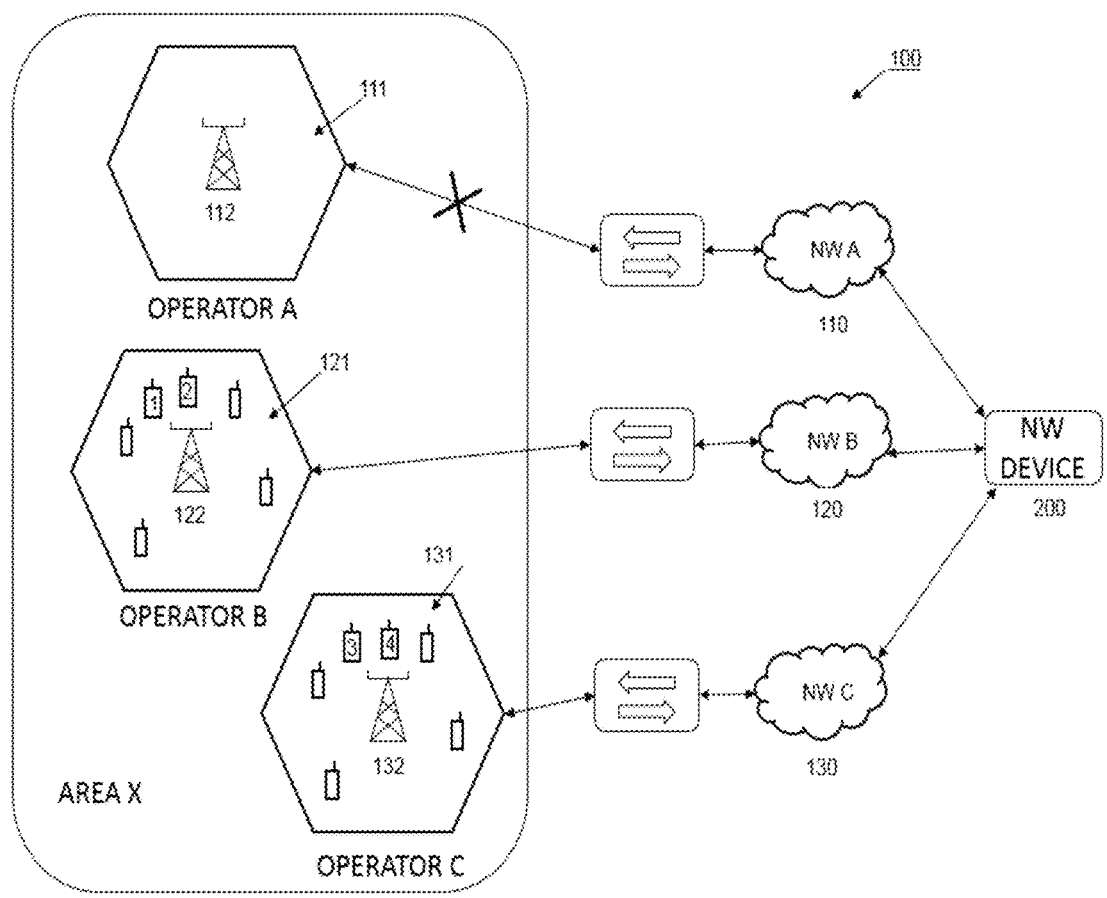

FIG. 2B illustrates the above scenario where all mobile devices of operator A have been relocated to the operators B and C respectively. The network provider that took over responsibility of the mobile device(s) that no longer can be served by the network it's a subscriber to, may include information about that in the next network utilization report that is sent to the network device to serve as input to the next determination of the individual list(s).

Below is an example of a format of a distribution list that e.g. operator A or network provider A transmit to the subscribing mobile devices.

| Prio NWs | MCC/MNC | SSID | 2G | 3G | 4G | 5G | WiFi |
|---|---|---|---|---|---|---|---|
| OP B | xxx/xxx | | Acc. | Rej. | Acc. | Rej. | |
| OP C | | qqq | | | | | Acc. |

The distribution list include additional information as will described.

The network distribution list may be distributed using SMS encryption (SMS secure) that is used today in mobile networks to inform a mobile device and the SIM about preferred roaming networks. According to embodiments herein the list may further include MCC/MNC for identifying a network, a SSID of the network and indication whether a radio access technology supported by an operator is valid or not in case of an emergency.

In the example above, the prioritized networks (Prio. NWs) for subscribers of network provider A are operator B (OP B) followed by OP C. MCC and MNC of OP B are exemplified as xxx/xxx, while for OP C, the SSID is qqq.

A mobile device of OP A trying to connect to OP B, knows that connection attempts using 2G and 4G may be accepted (Acc.), but 3G and 5G connections attempts rejected (Rej.). For OP C, only WiFi is available using the SSID indicated in the list. The individual list may also include information on the number of attempts a mobile device may try and timeout information before continuing with the next network provider or operator indicated in the list.

According to an embodiment herein, the emergency service profile is preconfigured per network provider or operator and includes service settings for a minimum service made available per user. A service profile may also indicate resource allocation information, such as uplink/downlink bandwidth, latency, Quality of Service (QoS). The emergency service profile may be assigned to mobile devices or users subscribing to the own network and/or to other network providers or operators.

According to an embodiment, the individual list includes the emergency service profile, per network provider. For example, the network device 200 may be provided in advance with the emergency service profile of a network provider. In this case, the network node or operator transmits, to the network device, the service profile together with the information on network utilization. When the network device 200 determines the individual list to this specific provider, the service profile is included in the list and sent to a network node of the network provider which in turn send the list to it subscribers.

Another example is that the network provider or operator include its emergency service profile in the individual list received from the network device and send it to its subscribers.

A distribution or individual list per network provider or operator may therefore include the following: information on other network providers or operators; the emergency service profile of the network provider, information on the radio access technologies supported by the other network providers, information on which radio access technology per provider, is allowed to connect to or is rejected, information on the services offered by the other network providers, the number of connection attempts, timeout information etc.

According to an embodiment, the mobile device is provided with an application emergency mode which is triggered or activated when the emergency service profile is active. For example, assuming that an emergency event occurs in a cell of network provider A or operator A. If the mobile device subscribing to operator A can no longer access its network, the mobile device is configured to select an alternative network provider or operator from the list in the order indicated and attempts to connect to it e.g. to operator B. Assuming that the connection to network provider or operator B is successful, the list includes information on services provided by operator B and also the emergency service profile that is associated with operator B, the application emergency mode is then activated. Activation of the profile triggers/activates the application emergency mode. At least one application or function may then (automatically) terminate or shut down because it will not work according to the emergency service profile of the selected network provider or operator (here B), or it does not fulfil the requirements of the emergency service profile of the selected network provider or operator.

This would free up resources or lower the load on the selected network due to that applications/functions would conform to the situation with limited resources available that the selected network provider may offer. For example, applications for streaming video or for sending large files etc. that require high resources will not be permitted. This also allows more mobile devices to use the minimum services provided by the selected network provider. Further, the battery consumption in the mobile device is reduced as unnecessary applications/functions shut down or become inactivated, which is very important in an emergency or catastrophic situation.

The mobile device displays to the user information on the activated mode and which functions and/or applications that are terminated and also which functions and/or applications that are permitted or available for the user.

Figure 3:
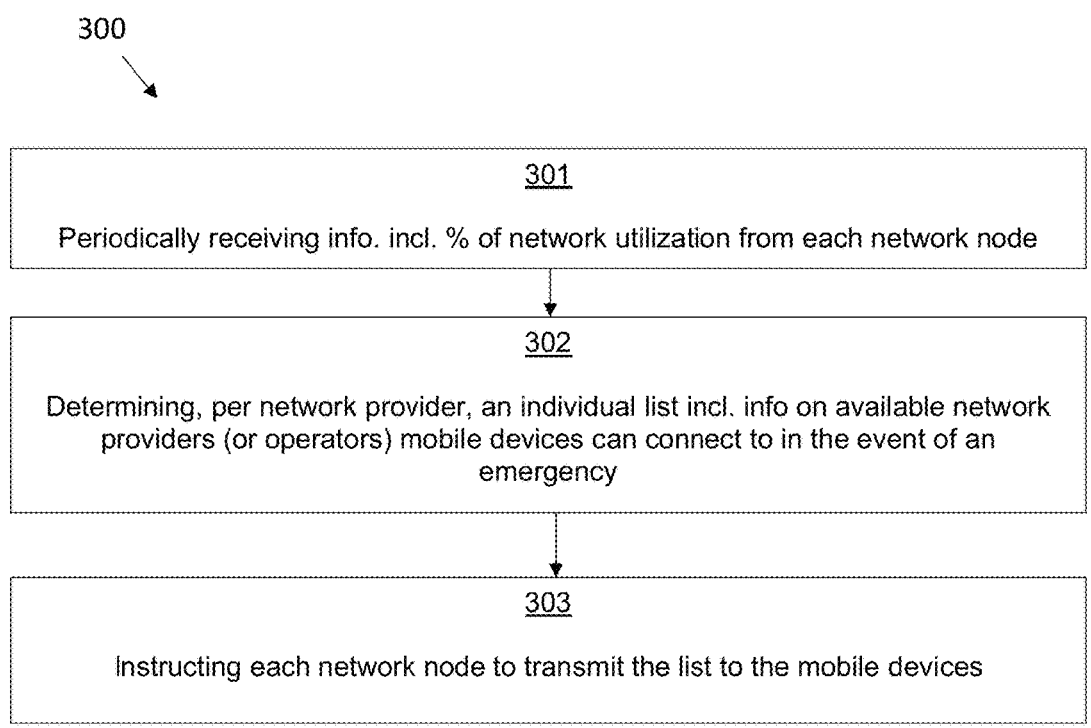
FIG. 3 illustrates a flowchart of a method performed by a network device according to embodiments herein.

Referring to FIG. 3 there is illustrated a flowchart of a method 300 performed by network device 400 (see FIG. 4) according to described embodiments herein. As disclosed, the network device 400 is connected to a plurality of network providers and/or operators. The connection may be to the Core Network (CN) of each network provider or to the Radio Access Network (RAN) of each network provider. Each RAN comprises at least one RBS serving at least one cell in which mobile devices are located. As previously described, the embodiments herein are applicable in relation to a defined domain such as a given geographical area as a city, a county or a country.

The method comprising:

(301) periodically receiving, from a network node (or RBS) of each network provider (or operator), information including a percentage of network utilization, (302) determining, for each network provider, based on at least the received percentage of network utilization of the network provider, an individual list including information on other available network providers (or operators) to which mobile devices subscribing to the network provider may connect to in the event of an emergency, and (303) instructing the network node of each network provider to transmit the determined individual list received from the network device, to mobiles subscribing to the network provider. The network node may transmit the list to the network providers that then distribute it further to the mobile devices.

As previously described, the individual list may also include the following: information on radio access technologies supported by each listed network provider; information on services, per network provider, that mobile devices may use, and an emergency service profile of each listed network provider.

The method further comprising updating the individual list of each network provider depending on the regularly reported percentage of network utilization received from the network node of each network provider.

Figure 4:
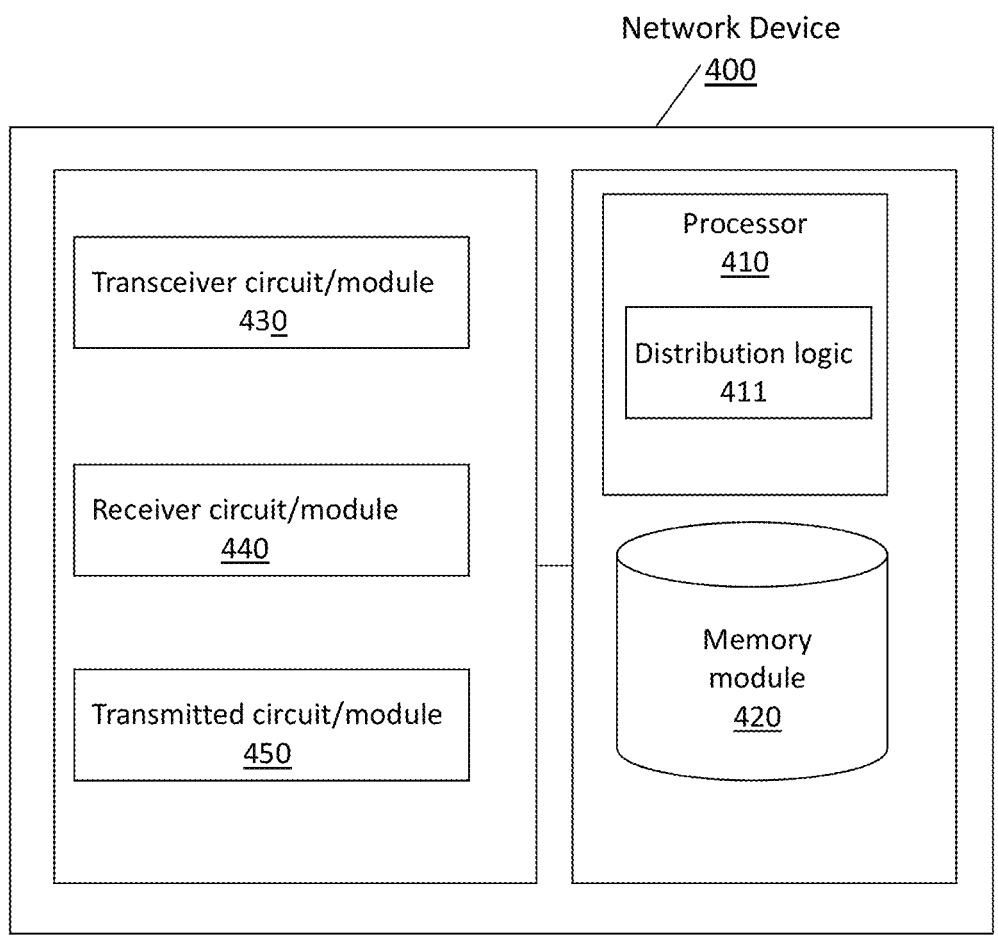
FIG. 4 is a block diagram depicting a network device according to embodiments herein.

To perform the method described above, a network device 400 is provided as depicted in FIG. 4. The network device 400 corresponds to network device (NW device) 200 depicted in FIG. 1 or FIG. 2.

The network device 400 comprises a processing circuit or a processing module or a processor 410, a receiver circuit or receiver module 440; a transmitter circuit or transmitted module 450; a memory module 420 and a transceiver circuit or module 430 which may include the transmitter circuit 450 and the receiver circuit 440.

The processor 410 includes a microprocessor, an application specific integrated circuit (ASIC), field programmable gate array (FPGA), or the like. The processor 410 controls the operation of the network device 400 and its components. Memory module 420 includes a random access memory module (RAM), a read only memory (ROM), and/or any type of memory to store data and computer program instructions of a computer program that may be used by the processor 410.

The execution of the program instructions adapts or configures the processor to carry out the operations of the network device 400 disclosed herein.

Further, it should be appreciated that the network device 400 may comprise additional components not shown in FIG. 4.

The instructions contained in the memory module 420 are executable by the processor 410 wherein the network device 400 is operative to periodically receive from a network node or RBS of each network provider (or operator), information including a percentage of network utilization. The reception may be performed via receiver circuit/module 440 or transceiver module/circuit 430.

The network device 400 is further operative to determine, based on at least the received information and for each network provider (or operator), an individual list including information on other available network providers (or operators) to which mobile devices subscribing to the network provider may connect to in the event of an emergency. This determination may be performed by a distribution logic 411 as shown in FIG. 4. The term distribution is used since each individual list includes information indicating to which network device (or operator) a mobile device may be handed over to in the event of an emergency.

The network device 400 is further operative to instruct the network node (or RBS) of each network provider (or operator) to transmit the individual list received from the network device 400 to mobile devices subscribing to the network operator. As previously described, the network device 400 is further operative to update the individual list of each network provider and send the list to the network provider which in turn transmits it to its subscribers.

Figure 5:
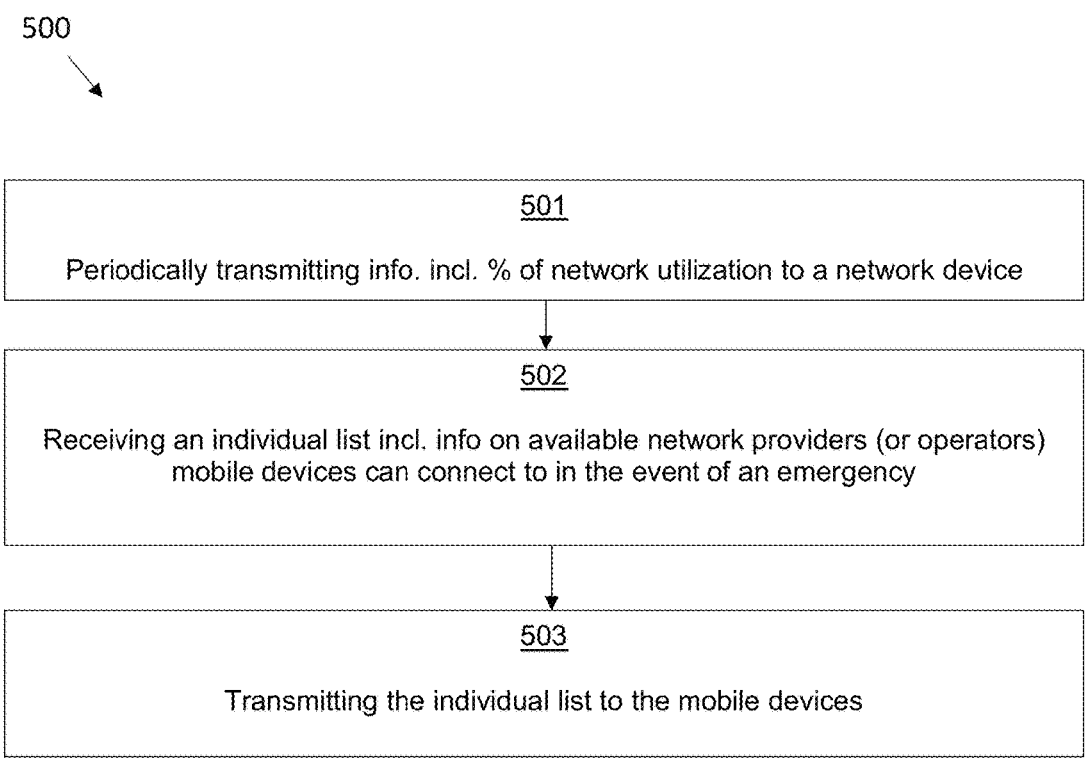
FIG. 5 illustrates a flowchart of a method performed by a network node according to embodiments herein.

Referring to FIG. 5 there is illustrated a flowchart of a method 500 performed by network node 600 (see FIG. 6) according to described embodiments herein. The network node 600 belonging to a network provider or operator may be a RBS, a NodeB, a eNodeB, an access point, a radio network controller etc. For example each of the radio base stations 112, 122, 132, depicted in FIG. 1 or FIG. 2 is an example of network node 600.

The method comprising:

(501) periodically transmitting, to the network device 400, and for a given geographical area, information including a percentage of network utilization, (502) receiving from the network device 400 an individual list including information on other available network providers (or operators) to which mobile devices subscribing to the network provider (that controls the network node 600) may connect to in the event of an emergency, and (503) transmitting the determined individual list to mobiles subscribing to the network provider.

The method further comprising, notifying the network device 400 in the event of a network failure or congestion or when at least one mobile device belonging to another network provider have been granted access to the network node 600. Note that if the network node 600 ceases during a predetermined time period, to transmit the information on the network utilization, the network device 400 interprets this as a network failure and this will trigger the utilization of the list by the mobile devices located in the cell of network node 600. This is also used as input to the distribution logic 411 of the network device 400 for updating the individual list(s).

There is also provided a computer program comprising instructions which when executed on at least one processor 411 of the network node 400, according to embodiments herein, cause the processor 411 to carry out the method described above. Also, a carrier containing the computer program of is provided, wherein the carrier is one of a computer readable storage medium; an electronic signal, optical signal or a radio signal.

Figure 6:
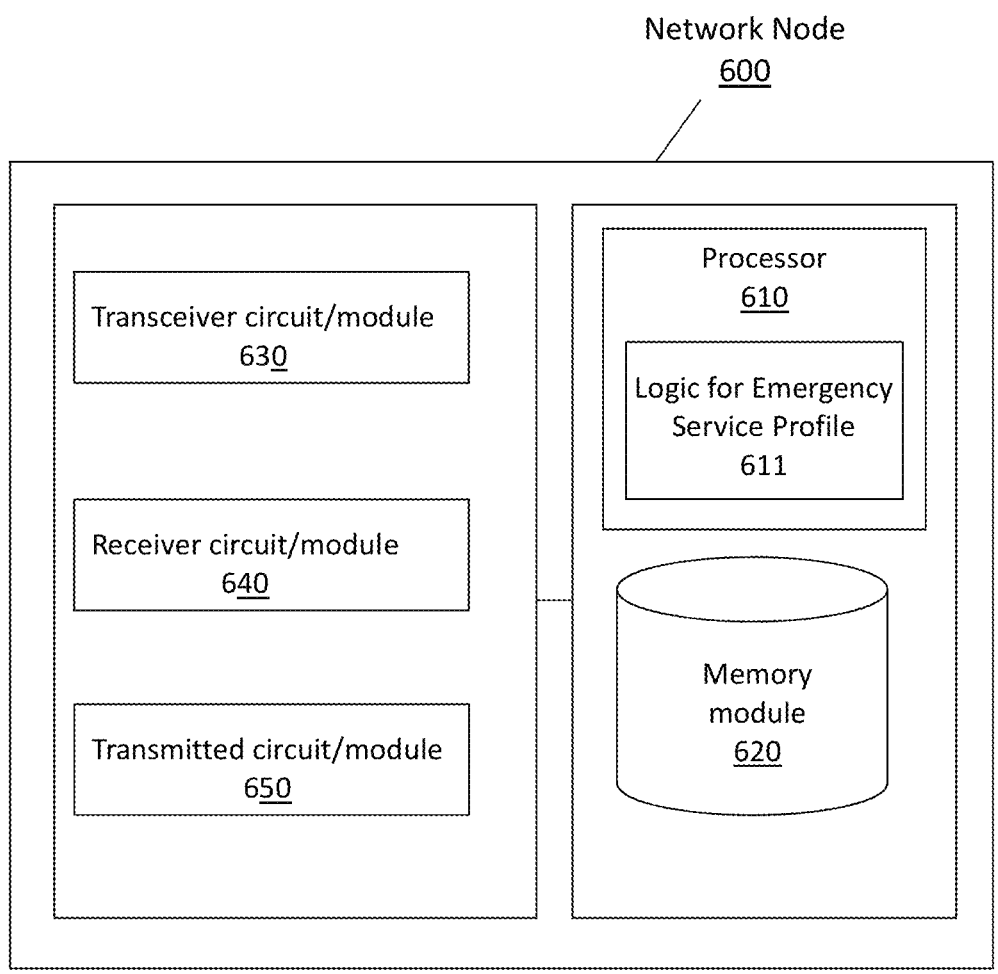
FIG. 6 is a block diagram depicting a network node according to embodiments herein.

To perform the method described above, a network node 600 is provided as depicted in FIG. 6.

The network node 600 comprises a processing circuit or a processing module or a processor 610, a receiver circuit or receiver module 640; a transmitter circuit or transmitted module 650; a memory module 620 and a transceiver circuit or module 630 which may include the transmitter circuit 650 and the receiver circuit 640. The network node 600 also comprises antennas and other components not shown in FIG. 6.

The processor 610 includes a microprocessor, an application specific integrated circuit (ASIC), field programmable gate array (FPGA), or the like. The processor 610 controls the operation of the network node 600 and its components. Memory module 620 includes a random access memory module (RAM), a read only memory (ROM), and/or any type of memory to store data and computer program instructions of a computer program that may be used by the processor 610. The execution of the program instructions adapts or configures the processor to carry out the operations of the network node 600 disclosed herein.

The instructions contained in the memory module 620 are executable by the processor 610 wherein the network node 400 is operative to periodically transmit to the network device 400, information including a percentage of network utilization. The transmission may be performed via transmitted circuit/module 640 or transceiver module/circuit 630.

The network node 600 is further operative to receive from network device 400 an individual list including information on other available network providers (or operators) to which mobile devices subscribing to the network provider or network node 600 may connect to in the event of an emergency.

The network node 600 is further operative to transmit the individual list to the mobile subscribers served by network node 600.

As previously described, an emergency service profile may be included in the individual list or be added to the list received from the network device. The emergency service profile is unique to the network provider that is controlling network node 600. For illustration purposes, a logic for the emergency profile 611 is depicted in FIG. 6 as part of the processor. The emergency service profile including service settings, resource allocation etc. is provided to the mobile device in the cell served by the network node 600 and this prior to the occurrence of the emergency.

There is also provided a computer program comprising instructions which when executed on at least one processor 611 of the network node 600, according to embodiments herein, cause the processor 611 to carry out the method described above. Also, a carrier containing the computer program of is provided, wherein the carrier is one of a computer readable storage medium; an electronic signal, optical signal or a radio signal.

Figure 7:
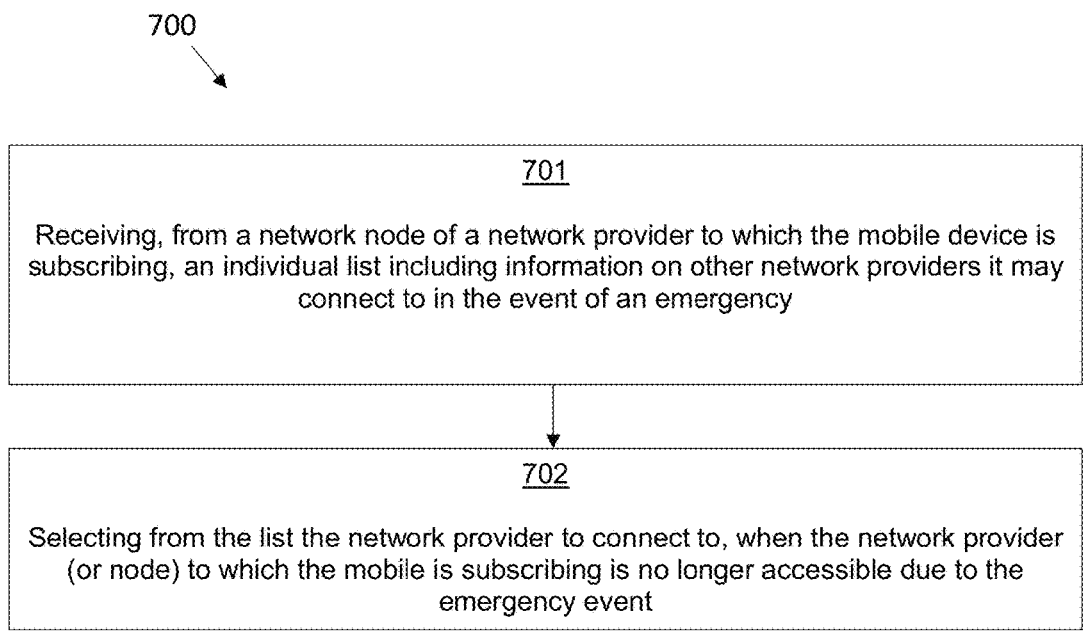
FIG. 7 illustrates a flowchart of a method performed by a mobile device according to embodiments herein.

Referring to FIG. 7, there is depicted a flowchart of a method 700 performed by mobile device 800 (see FIG. 8) according to described embodiments herein. The mobile device being located in a given geographical area comprising a plurality of network providers (or network nodes) each connected to a network device as previously described.

The method comprising:

(701) receiving from a network node of a network provider or operator to which the mobile device is subscribing, an individual list including information on other available networks or operator, in the geographical are, to which the mobile device may connect to in the event of an emergency, and (701) in the event of an emergency, selecting from the received list the network provider to connect to, when the network provider or operator to which the mobile device is subscribing is no longer accessible due to the emergency event.

The mobile device attempts to connect the network provider in the order listed in the received list. As previously described, the list includes an emergency service profile; a list of services offered by each provider indicated in the list and also which radio access technologies supported by each network provider.

The method further comprises, if the connection to the selected network provider (or operator) is successful, activating an application emergency mode and terminating functions and/or applications in the mobile device which do not fulfill the requirements of the emergency profile of the selected network.

The emergency service profile is activated when the connection to the selected network is successful. This connection is thus of an emergency service profile type. Activation of the emergency service profile activates or triggers the application emergency mode. When the emergency service profile is active, at least one application in the device would adopt and conform to the service settings included in the emergency service profile. The resource allocation information such as bandwidth than can be allocated to a certain service may also be taken into consideration when terminating an application or setting.

As an example, if the services offered by the selected network are restricted to SMS and voice services, the uplink or downlink bandwidth is limited according to the resource allocation information. This will trigger the application emergency mode to automatically shut down applications and/or functions related to other services (web browsing, streaming, MMS etc.).

The user of the mobile device is informed, by means of the user interface on the display, about applications and/or functions that will not work. This to avoid that the user try to activate those applications and/or functions. The user is also informed, via the display, about services, applications and/or functions that are available and that work in the selected network.

Figure 8:
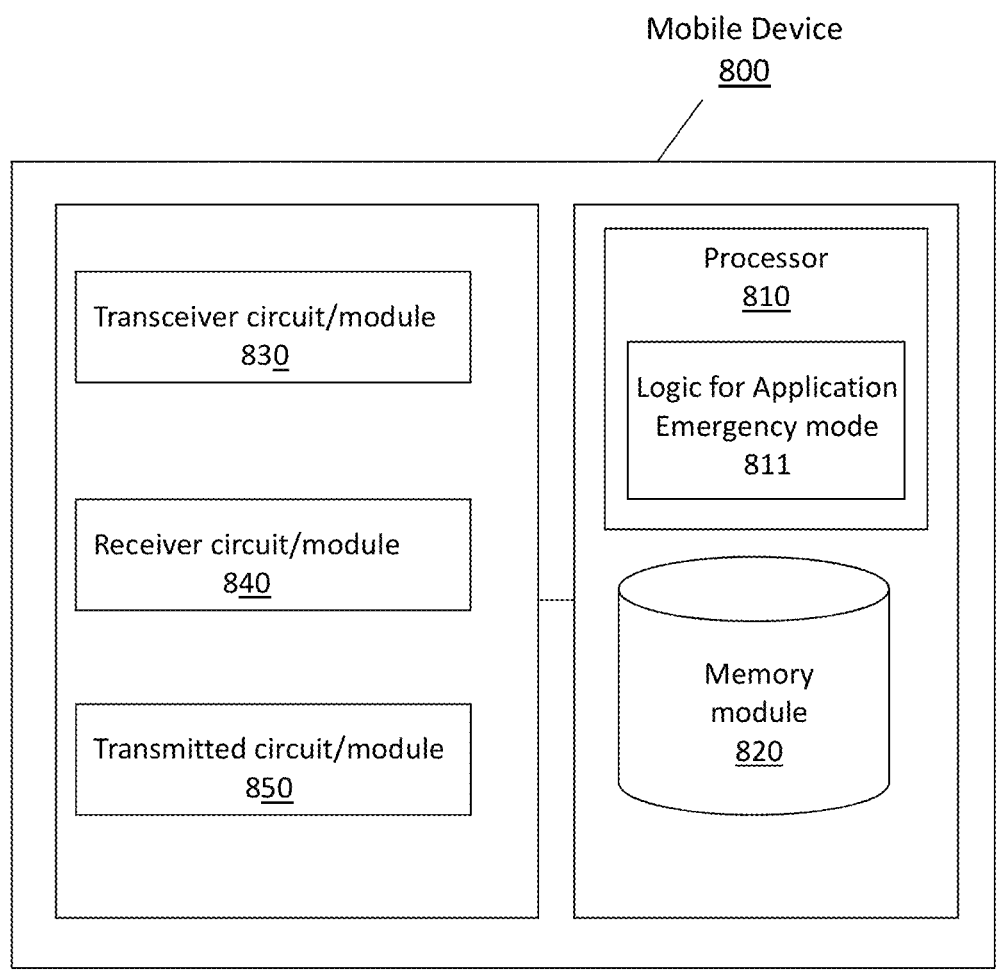
FIG. 8 is a block diagram depicting a mobile device according to embodiments herein.

To perform the method described above, a mobile device 800 is provided as depicted in FIG. 8.

The mobile device 800 comprises a processing circuit or a processing module or a processor 810, a receiver circuit or receiver module 840; a transmitter circuit or transmitted module 850; a memory module 820 and a transceiver circuit or module 830 which may include the transmitter circuit 850 and the receiver circuit 840.

The processor 810 includes a microprocessor, an application specific integrated circuit (ASIC), field programmable gate array (FPGA), or the like. The processor 810 controls the operation of the network device 800 and its components. Memory module 820 includes a random access memory module (RAM), a read only memory (ROM), and/or any type of memory to store data and computer program instructions of a computer program that may be used by the processor 810.

The execution of the program instructions adapts or configures the processor 810 to carry out the operations of the mobile device 800 disclosed herein. Further, it should be appreciated that the mobile 400 may comprise additional components not shown in FIG. 8.

The instructions contained in the memory module 820 are executable by the processor 810 wherein the mobile device 800 is operative to receive from a network node or RBS of a network provider (or operator) to which the mobile device 800 is subscribing, an individual list including information on other network providers (or operators) it may connect to in the event of an emergency.

The reception of the list may be performed via receiver circuit/module 840 or transceiver module/circuit 830.

The mobile device 800 is further operative to select from the received list the network provider (or operator) to connect to in the event of an emergency. This is performed when the mobile device 800 can no longer access its own network provider i.e. the one it is subscribing to due to the emergency event.

The mobile device 800 further comprises a logic or application emergency mode 811 which is shown being part of the processor 810.

The function this emergency mode has already been described and need not be repeated.

There is also provided a computer program comprising instructions which when executed on at least one processor 810 of the mobile device 800, according to embodiments herein, cause the processor 810 to carry out the method described above. Also, a carrier containing the computer program of is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that any type of wireless access technology systems, including, 2G, 3G, LTE, 5G, WiMax, WiFi etc., may benefit from exploiting the ideas covered within this disclosure.

The invention claimed is:

1. A method performed by a network device connected to a plurality of network providers in a given geographical area, the method comprising:

periodically receiving, from a network node of each network provider, information including a percentage of network utilization;

determining, for each network provider, based on at least the received percentage of network utilization of the network provider, an individual list including information on other available network providers to which mobile devices subscribing to the network provider may connect to in the event of an emergency; and instructing the network node of each network provider to transmit said determined individual list received from the network device, to mobile devices subscribing to the network provider, the list including an emergency service profile per available network provider, the emergency service profile indicating at least service settings and resource allocation information, and the emergency service profile being activated when connection to the network provider is successful.

2. The method according to claim 1 wherein each individual list further includes information on services, per available network provider, that said mobile devices may use, and the individual list further includes an emergency service profile, per available network provider, the profile indicating at least service settings and resource allocation information.

3. The method according to claim 1 further comprising updating the individual list of each network provider depending on at least the regularly reported percentage of network utilization received from the network node of each network provider.

4. A method performed by a network node of a network provider connected to a network device to which a plurality of network providers are connected, the method comprising:

periodically transmitting, to the network device and for a given geographical area, information including a percentage of network utilization;

receiving from the network device an individual list including information on other available network providers, in the geographical area, to which mobile devices subscribing to the network provider may connect to in the event of an emergency; wherein the individual list is determined by the network device based on at least the information including the percentage of network utilization;

receiving an instruction from the network device to transmit the individual list received from the network device, to mobile devices subscribing to the network provider; and transmitting said individual list to the mobile devices;

the list including an emergency service profile per available network provider, the emergency service profile indicating at least service settings and resource allocation information, and the emergency service profile being activated when connection to the network provider is successful.

5. The method according to claim 4 further comprising notifying the network device in the event of a network failure or congestion or when at least one mobile device subscribing to another network provider has been granted access to the network node.

6. A method performed by a mobile device in a given geographical area comprising a plurality of network providers each connected to a network device, the method comprising:

receiving, from a network node of a network provider to which the mobile device is subscribing, an individual list including information on other available network providers, in the geographical area, to which the mobile device may connect to in the event of an emergency, the list including an emergency service profile per available network provider, the emergency service profile indicating at least service settings and resource allocation information; and in the event of an emergency, selecting from said list a network provider to connect to, when the network provider to which the mobile device is subscribing is no longer accessible due to the emergency event, the emergency service profile being activated when connection to the network provider is successful.

7. The method according to claim 6 wherein the list further includes an emergency service profile, per available network provider, the profile indicating at least service settings and resource allocation information.

8. The method according to claim 7 comprising: if the connection to the selected network provider is successful, activating an application emergency mode and terminating at least one of functions and applications in the mobile device that do not fulfil the requirements of the emergency service profile of the selected network provider.

9. A network device configured to be connected to a plurality of network providers in a given geographical area, the network device comprising a processor and a memory containing instructions executable by the processor, wherein the network device is operative to:

periodically receive, from a network node of each network provider, information including a percentage of network utilization;

determine, for each network provider, based on at least the received percentage of network utilization of the network provider, an individual list including information on other available network providers to which mobile devices subscribing to the network provider may connect to in the event of an emergency; and instruct the network node of each network provider to transmit said determined individual list received from the network device, to mobile devices subscribing to the network provider;

the list including an emergency service profile per available network provider, the emergency service profile indicating at least service settings and resource allocation information, and the emergency service profile being activated when connection to the network provider is successful.

10. The network device according to claim 9 wherein each individual list further includes information on services, per available network provider, that said mobile devices may use, and wherein the individual list further includes an emergency service profile, per available network provider, the profile indicating at least service settings and resource allocation information.

11. The network device according to claim 9 is further operative to update the individual list of each network provider depending on at least the regularly reported percentage of network utilization received from the network node of each network provider.

12. A network node of a network provider connected to a network device to which a plurality of other network providers are connected, the network node comprising a processor and a memory containing instructions executable by the processor, wherein the network node is operative to:
  periodically transmit, to the network device and for a given geographical area, information including a percentage of network utilization;
  receive from the network device an individual list including information on other available network providers in the geographical area, to which mobile devices subscribing to the network provider may connect to in the event of an emergency, wherein the list is determined by the network device based on at least the information including the percentage of network utilization,
  receive an instruction from the network device to transmit the individual list received from the network device, to mobile devices subscribing to the network provider; and
  transmit the individual list to the mobile devices;
    the list including an emergency service profile per available network provider, the emergency service profile indicating at least service settings and resource allocation information, and the emergency service profile being activated when connection to the network provider is successful.

13. The network node according to claim 12 wherein the individual list further includes information on services, per available network provider, that said mobile devices may use, and the individual list further includes an emergency service profile, per available network provider, the emergency service profile indicating at least service settings and resource allocation information.

14. The network node according to claim 12 is further operative to notify the network device in the event of a network failure or congestion or when at least one mobile device subscribing to another network provider has been granted access to the network node.

15. A mobile device in a given geographical area comprising a plurality of network providers each connected to a network device, the mobile device comprising a processor and a memory containing instructions executable by the processor, wherein the mobile device is operative to:
  receive, from a network node of a network provider to which the mobile device is subscribing, an individual list comprising information on other available network providers, in the given geographical area, to which the mobile device may connect to in the event of an emergency, the list including an emergency service profile per available network provider, the emergency service profile indicating at least service settings and resource allocation information; and
  in the event of an emergency, select from said list a network provider to connect to when the network provider to which the mobile device is subscribing is no longer accessible due to the emergency event, the emergency service profile being activated when connection to the network provider is successful.

16. The mobile device according to claim 15 wherein the list further includes an emergency service profile, per available network provider, the profile indicating at least service settings and resource allocation information.

17. The mobile device according to claim 16 is operative to activate an application emergency mode if the connection to the selected network provider is successful, and to terminate at least one of applications and functions in the mobile device that do not fulfil the requirements of the emergency service profile of the selected network provider.

* * * * *